United States Patent
Lang et al.

(10) Patent No.: US 8,786,118 B2
(45) Date of Patent: Jul. 22, 2014

(54) ENERGY-EFFICIENT WIRELESS COMMUNICATION SCHEME FOR WIND TURBINES

(75) Inventors: Christoph Lang, Cupertino, CA (US); Mahito Ando, Baden-Baden (DE); Ralf Schmidt, Gerlingen (DE); Lakshmi Venkatraman, Mountain View, CA (US); Peter Volkmer, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 13/189,467

(22) Filed: Jul. 22, 2011
(Under 37 CFR 1.47)

(65) Prior Publication Data
US 2013/0022462 A1    Jan. 24, 2013

(51) Int. Cl.
*F03D 9/00*    (2006.01)
(52) U.S. Cl.
USPC ............................................. 290/44; 290/55
(58) Field of Classification Search
USPC .............................. 290/43, 44, 55, 54; 416/41
See application file for complete search history.

(56) References Cited
U.S. PATENT DOCUMENTS

| | | | |
|---|---|---|---|
| 7,059,822 B2 | 6/2006 | LeMieux et al. | |
| 7,183,665 B2 | 2/2007 | Bywaters et al. | |
| 8,317,471 B2 * | 11/2012 | Axelsson et al. | 416/41 |
| 8,591,187 B2 * | 11/2013 | Bagepalli et al. | 416/1 |
| 2009/0129925 A1 * | 5/2009 | Vronsky et al. | 416/61 |
| 2010/0030495 A1 | 2/2010 | Jackson | |
| 2010/0076614 A1 * | 3/2010 | Nies et al. | 700/287 |

FOREIGN PATENT DOCUMENTS

| | | |
|---|---|---|
| EP | 1712882 A1 | 10/2006 |
| EP | 2202406 A2 | 6/2010 |

* cited by examiner

*Primary Examiner* — Nicholas Ponomarenko
(74) *Attorney, Agent, or Firm* — Maginot, Moore & Beck

(57) ABSTRACT

A method of operating a wind turbine includes providing a wind turbine having a plurality of blades. A respective sensor is attached to each of the blades. First measurements of a structural characteristic of each of the blades are repeatedly taken by use of the sensors. A tolerance band is established for the measurements. Signals indicative of the first measurements are wirelessly transmitted only if the first measurements are outside of the tolerance band. The transmitted signals are received at a controller. An actuator signal is sent from the controller to at least one actuator associated with the blades. The sending is in response to the receiving of the transmitted signals. At least one of the blades is actuated dependent upon the actuator signal. The actuating is performed by the at least one actuator. Second measurements of the structural characteristic of each of the blades are repeatedly taken by use of the sensors after the actuating step. The wirelessly transmitting, receiving, sending and actuating steps are repeated for the second measurements.

20 Claims, 4 Drawing Sheets

ENERGY-EFFICIENT WIRELESS COMMUNICATION SCHEME FOR WIND TURBINES

BACKGROUND OF THE INVENTION

1. Field of the Invention

The present invention relates to communication schemes for machines, and, more particularly, to communication schemes for wind turbines.

2. Description of the Related Art

Harvesting wind energy via wind turbines to supply electrical power is an increasing market. On a pitch controlled wind turbine, the electronic controller of the turbine checks the power output of the turbine multiple times per second. When the power output becomes too high, the electronic controller sends a command to the blade pitch actuator which immediately pitches (turns or rotates) the rotor blades slightly out of the wind (i.e., so the face of the blade is not so nearly perpendicular to the wind direction). Conversely, the blades are turned back into the wind (i.e. so the face of the blade is more perpendicular to the wind direction) whenever the wind drops again. Thus, the rotor blades have to be able to rotate about their longitudinal axis in order to pitch.

During normal operation the blades may pitch less than one degree at a time, all while the rotor is turning. A pitch controlled, or "variable pitch" wind turbine may typically be designed such that the rotor blades pitch exactly the desired amount. On a pitch controlled wind turbine, the central controller may pitch the blades a few degrees each time the wind changes to thereby maintain the rotor blades at an optimum angle and maximize power output for all wind speeds. The actuator for changing the pitch is usually hydraulic.

The rotor blades of the turbine are typically designed with maximum length and minimum size in order to increase efficiency, which, however, also subjects the blades to relatively high deflection forces. Such deflection forces may cause fatigue and eventually failure in the blades and other wind turbine components. Thus, deflection should be sensed, controlled and minimized. For example, if the amount of deflection becomes too great, then the central controller may send a command to the hydraulic actuator to change the pitch such that the blade faces more away from the wind.

In order to monitor the condition of wind turbines, including the amount of deflection of the blades, sensors can be installed on the rotor blades. These sensors need to communicate with a central controller which is normally located in the tower of the wind turbine. The sensors communicate with the central controller via wired connections. The electrical connection between the rotating blade and the stationary tower may be achieved with the use of slip rings.

There are problems associated with the use of slip rings, however. First, slip rings are a relatively expensive type of electrical connector because they must be designed to withstand nearly continuous motion of their components relative to each other. Second, despite the relatively high level of engineering that goes into the design of slip rings, they may have a higher rate of failure than other types of electrical connectors because of the constant motion and mechanical forces to which they are subjected during operation. Third, the use of a slip ring in a wind turbine increases the susceptibility to lightning strikes because lightning that hits a blade of the wind turbine may be carried to the central unit in the tower via the slip ring.

What is neither disclosed nor suggested in the art is an electrical communication scheme for a wind turbine that does not require the use of a slip ring with its associated problems and limitations as described above.

SUMMARY OF THE INVENTION

The present invention provides an energy-efficient communication scheme for wind turbines. However, the invention may also be applied to other types of machines, appliances and utilities.

More particularly, the invention may provide a wireless connection between the sensors on the rotor blades and the central unit in the base station, thus making all wiring, including slip rings, obsolete.

The invention comprises, in one form thereof, a method of operating a wind turbine, including providing a wind turbine having a plurality of blades. A respective sensor is attached to each of the blades. First measurements of a structural characteristic of each of the blades are repeatedly taken by use of the sensors. A tolerance band is established for the measurements. Signals indicative of the first measurements are wirelessly transmitted only if the first measurements are outside of the tolerance band. The transmitted signals are received at a controller. An actuator signal is sent from the controller to at least one actuator associated with the blades. The actuator signal is sent in response to the receiving of the transmitted signals. At least one of the blades is actuated dependent upon the actuator signal. The actuating is performed by the at least one actuator. Second measurements of the structural characteristic of each of the blades are repeatedly taken by use of the sensors after the actuating step. The wirelessly transmitting, receiving, sending and actuating steps are repeated for the second measurements.

The invention comprises, in another form thereof, a method of controlling a machine, including providing a sensor associated with the machine. First measurements of a parameter associated with the machine are repeatedly taken by use of the sensor. A tolerance band is established for the measurements. Signals indicative of the first measurements are wirelessly transmitted only if the first measurements are outside of the tolerance band. The transmitted signals are received at a controller. An actuator signal from the controller is sent to at least one actuator associated with the machine. The actuator signal is sent in response to the receiving of the transmitted signals. At least one part of the machine is actuated dependent upon the actuator signal. The actuating is performed by the at least one actuator. Second measurements of the parameter of the machine are repeatedly taken by use of the sensor after the actuating step. The wirelessly transmitting, receiving, sending and actuating steps are repeated for the second measurements.

The invention comprises, in yet another form thereof, a method of controlling a machine, including installing a sensor, a controller and an actuator associated with the machine. Upon startup of the machine, the sensor, controller and actuator are operated in a closed loop fashion. The closed loop operation includes taking a first startup measurement of a parameter associated with the machine. The measurement is taken by use of the sensor. A startup measurement signal indicative of the startup measurement is wirelessly transmitted. The transmitted startup measurement signal is received at a controller. A startup actuator signal is from the controller to the actuator in response to the receiving of the transmitted startup signal. At least one part of the machine is actuated dependent upon the startup actuator signal. The actuating is performed by the actuator. A second startup measurement is taken of the parameter of the machine. The second startup measurement is taken by use of the sensor after the actuating step. The wirelessly transmitting, receiving, sending and actuating steps are repeated for the second startup measurements. A tolerance band is calculated for steady state measurements of the parameter. The calculating is dependent upon the received startup measurement signals. The calculated tolerance band is wirelessly transmitted from the controller to the sensor. The machine is operated in steady state in an open loop fashion, including repeatedly taking first steady state measurements of the parameter associated with the machine. The first steady state measurements are taken by use of the sensor. Steady state measurement signals indicative of the first steady state measurements are wirelessly transmitted only if the first steady state measurements are outside of the tolerance band. The transmitted first steady state measurement signals are received at a controller. A steady state actuator signal is sent from the controller to the actuator in response to the receiving of the transmitted first steady state measurement signals. At least one part of the machine is actuated dependent upon the steady state actuator signal. The actuating is performed by the actuator. Second steady state measurements are repeatedly taken of the parameter of the machine. The measurements are taken by use of the sensor after the actuating has been performed that is based on the steady state actuator signal. The wirelessly transmitting, receiving, sending and actuating steps are repeated for the second steady state measurements.

An advantage of the present invention is that it provides electrical communication at a lower cost, as no wiring and no slip rings are required.

Another advantage is that the wireless communication is not subject to wear and mechanical forces, and thus provides greater reliability.

Yet another advantage is that wireless communication provides more robust protection against lightning strikes on the rotor blade, as there is no conductive path from the rotor blade to the processing unit within the tower.

Still another advantage is that the wireless may transmit sensor data only when the data is actionable by the controller, thereby extending the battery life of the sensor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
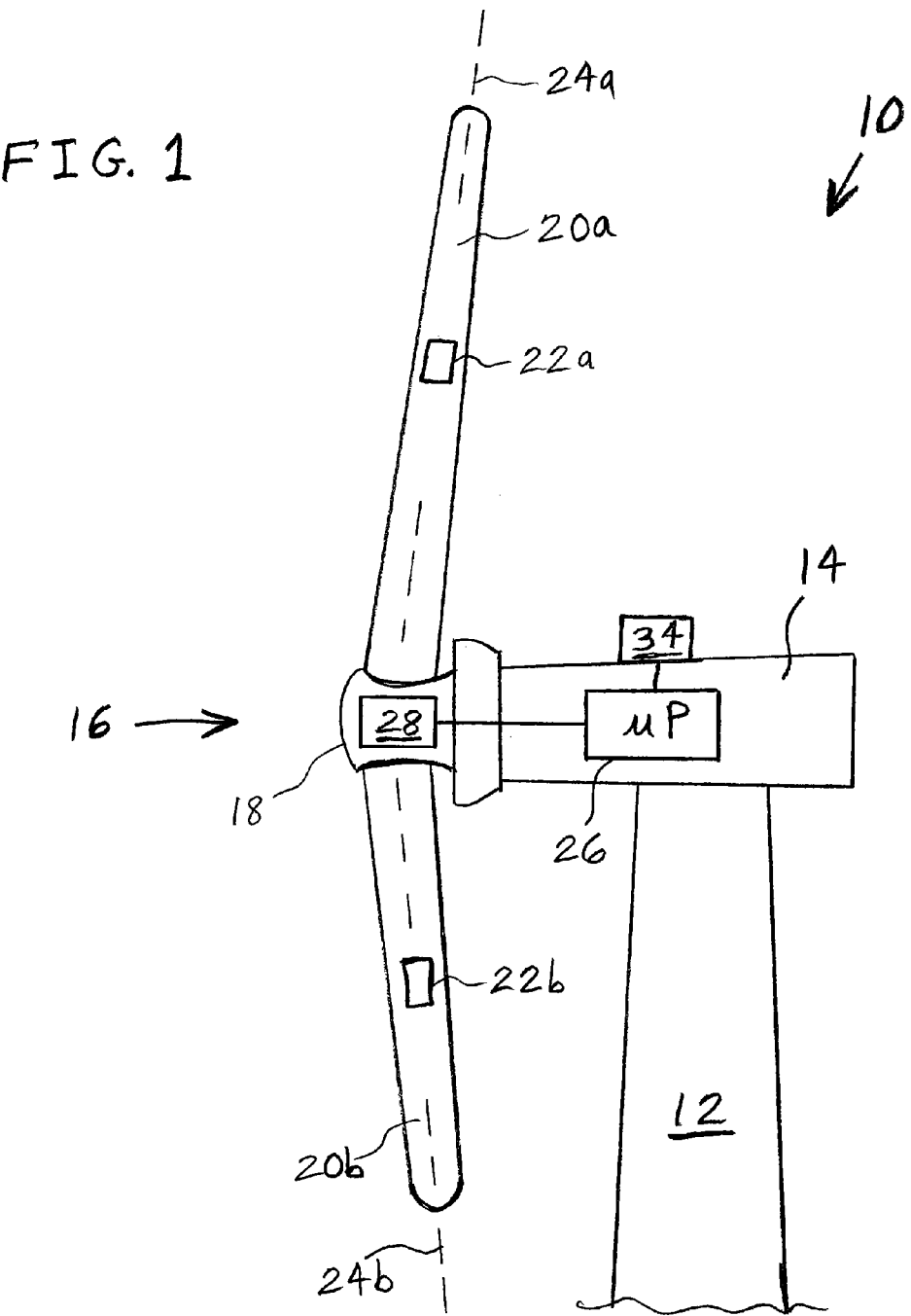
FIG. 1 is a fragmentary schematic view of one embodiment of a wind turbine arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a wind turbine arrangement 10 of the present invention, including a tower 12 which may be securely anchored to the ground (not shown). Attached to the opposite, top end of tower 12 is a nacelle 14 coupled to a rotor 16. Rotor 16 includes a hub 18 coupled to a plurality of rotor blades 20a-b. In the illustrated embodiment, rotor 16 includes three blades 20, but may include a greater or lesser number of blades than three. Only two of the three blades 20 are visible in FIG. 1.

Mounted on each of blades 20a-b is a respective deflection sensor 22a-b that measures a degree to which the blade deviates from a neutral position (i.e., a respective longitudinal axis 24a-b) of the blade. Each of sensors 22 may be a strain gauge, an optical sensor, an inductive sensor, a magnetic field sensor, an accelerometer, or an acoustical sensor for example.

Disposed within nacelle 14 is a central controller 26 electrically connected to a blade actuator 28 within hub 18. Central controller 26 can be disposed anywhere within the wireless range of sensors 22. For example, central controller 26 may be disposed at the base of tower 12. Blade actuator 28 may be mechanically coupled to each of the blades such that actuator 28 may rotate each of the blades about its respective longitudinal axis 24 (i.e., adjust the pitch of the blades). In this wind turbine embodiment, one example of the actuator output is the pitch of the rotor blades. Each of blades 20 may be divided into segments along its respective longitudinal axis 24 such that only one of the segments, e.g., the most radially outward segment, is rotated about axis 24 by actuator 28. Although only one actuator 28 is shown in FIG. 1, each of the blades may have its own respective blade actuator.

Output signals from sensors 22 may be used to adjust the pitch of rotor blades 20 during revolution of the blades. Thus, the communication between sensor nodes 22 and central controller 26 may happen at a relatively high rate of data transmission. Because arrangement 10 employs wireless communication, the high rate of data transmission may put a heavy burden on the battery power supply (not shown) of sensors 22. Such a high burden on the battery could potentially make a wireless approach infeasible due to the limited lifetime of the battery. This high burden on the battery may be partially due to the fact that wireless sensor nodes are normally "duty-cycled," which means that the sensor nodes go into power down modes with very little current consumption while the nodes are not communicating. However, when the nodes need to communicate, the nodes "wake up" and transmit/receive signals. This awake state may consume about one thousand times more power than does the power down mode. After the nodes are finished with transmitting and receiving signals in the awake state, the sensor nodes go back into the power down mode again, and the operating cycle of the sensors alternates between the awake state and the power down mode. Due to the high data rate and the frequent communication between the sensor nodes in the system described above, the sensors have to transmit signals very frequently. This frequent transmission of signals may drain the battery to a low level or even to empty.

Figure 2:
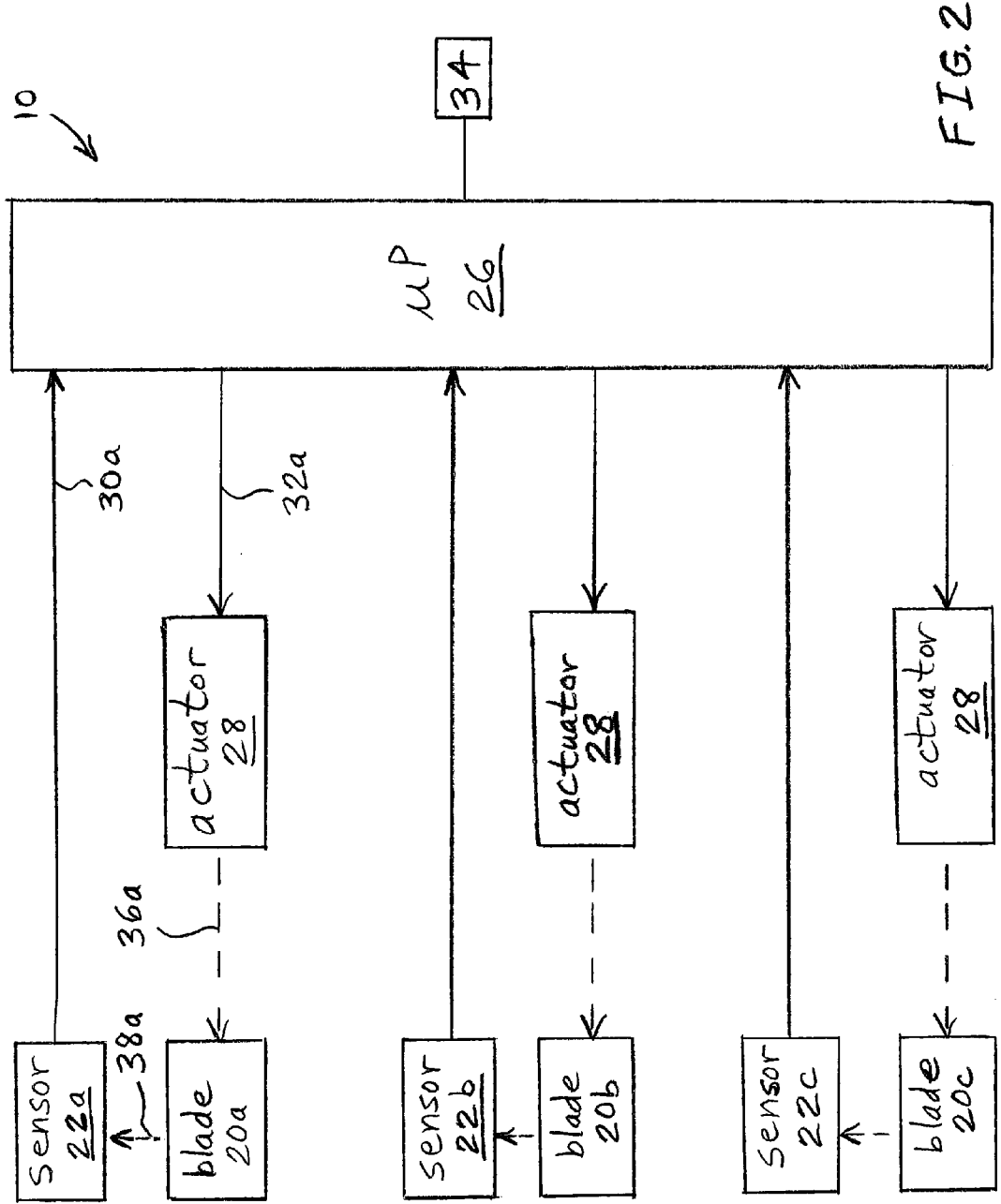
FIG. 2 is a block diagram of the wind turbine arrangement of FIG. 1.

As shown in FIG. 2, arrangement 10 may operate a respective feedback loop for each of the three blades 20. More particularly, sensor 22a may transmit radio frequency wireless signals 30a to central controller 26. Signals 30a may indicate the degree to which blade 20a is deflected from its normal undistorted state. Excessive deflection of a blade may result in blade fatigue, blade breakage, and/or the blade hitting tower 12. Excessive deflection of a blade may also be indicative of rotor 16 rotating at too high of a speed, which could result in electrical damage or catastrophic failure. Accordingly, when the deflection of blade 20a is sensed to be above a safe value, sensor 22a transmits a wireless signal 30a to central controller 26 indicative of the excessive deflection. However, in order to conserve battery power, so long as the measured parameter remains within the tolerance band, sensor 22a may refrain from sending signals 30a.

Central controller 26 may respond to the signal 30a indicating excessive deflection by transmitting a command signal 32a to actuator 28. Signal 32a may instruct actuator 28 to rotate blade 20a about axis 24a (i.e., to adjust the pitch of blade 20a) such that blade 20a does not present as much surface area in the direction of the wind. Thus, the wind will exert less force on blade 20a, and the deflection of blade 20a may be reduced.

A wind direction sensor 34 may be in communication with central controller 26 and may provide instantaneous wind direction data. Wind direction sensor 34 may be provided on top of nacelle 14, for example.

As indicated at 36a, actuator 28 may respond to signal 32a by rotating blade 20a about axis 34a. Sensor 22a may then sense, as indicated at 38a, a reduction in blade deflection. Sensor 22a then may re-transmit a signal 30a that is indicative of the new level of blade deflection, thereby completing the feedback loop. Similar feedback loops are operated for blades 20b-c and respective sensors 22b-c.

According to one embodiment of the invention, instead of there being a permanently closed loop between sensor 22, controller 26 and actuator 28, the system operates in an open loop fashion or configuration for as long as possible by applying a sequence of input values to actuators 28. This sequence may cover the time period for one revolution of the rotor blade (i.e., one complete rotation of rotor 16) and may be repeated with each new revolution. Sensors 22 may continue to measure data at the same rate as in a closed loop system. However, sensors 22 do not transmit any data to the base station (e.g., controller 26) so long as the sensor data is within a predefined tolerance band. Sensors 22 compare the collected data measurements with the tolerance band. This comparison may be performed locally within the sensor nodes. Thus, sensors 22 may have some processing capability in order to ascertain whether the collected data is within limits.

As soon as the sensor data goes beyond the limits of the predefined tolerance band, sensor 22 may initiate a communication between the sensor node and the base station (e.g., controller 26) in order to supply the recent sensor data to the controller. Controller 26 may then calculate a new sequence of control data for actuator 28. For example, if the sensor data indicates that the blade deflection is above the allowed limits, then controller 26 may send a sequence of control data (e.g., commands) to actuator 28 to cause the blade 20 to turn away from the wind and thereby reduce the deflection. The control data sent by controller 26 may possibly be based on the current wind direction data from wind direction sensor 34. The control data, which is used to control actuator 28 throughout a complete revolution of rotor 16, may also take into account the orientation of the blade vis-à-vis the wind direction throughout the rotation around rotor 16.

The new or "revised" sequence of blade control data may then be repeated for each revolution of the rotor 16 until the sensor data again includes deflection values that are out of the tolerance band. For example, if the wind dies down, the measured deflection of the blades could fall below tolerance. Such a low level of blade deflection may indicate that the blades could safely be allowed to rotate faster and generate a higher level of electrical power. In this case, the revised sequence of blade control data may generally cause the blades to more squarely face the wind and thus experience a greater degree of deflection.

The tolerance band for the sensor data may be stored in memory within each of the sensors. However, the desired tolerance band may change with time due to deterioration of the blades or different electrical power generation parameters, for example. Thus, in one embodiment, central controller 26 may wirelessly transmit revised tolerance bands as needed to the sensors, and the sensors may store the newly received tolerance bands in local memory.

Because the sensors transmit sensor data only when needed, e.g., only when the central controller 26 needs to take some action by changing the control sequence data, battery power usage is reduced and sensor battery life is extended. For example, if the scheme of the present invention leads to sensors communicating a sequence of data only once per minute instead of one hundred times per second, then the demands for sensor battery power needed for communication may be reduced by a factor of 6,000.

In one embodiment, immediately after installation, e.g., upon startup, arrangement 10 may operate in a closed loop mode or fashion for a couple of initial revolutions of rotor 16. Thus, sensors 22 may initially wireless transmit all of their readings to central controller 26. Likewise, controller 26 may respond to each set of readings from sensors 22 by sending a new set of command data to actuator 28. In addition to blade deflection, the command data from controller 26 may depend upon measured wind speed, the rotational speed of rotor 16, and the level of electrical power being produced. In response to the command data from controller 26, actuator 28 may then continuously tweak the rotational positions of blades 20 about respective axes 24. This startup operation may be considered to be closed loop in the sense that each sensor reading results in, and/or affects, an actuator signal that is used to control actuator 28, and that thus also affects future sensor readings.

As wind turbine arrangement 10 begins to operate in the startup mode, controller 26 may adjust its command data to actuator 28 in order to reach optimal, or at least acceptable, values for electrical power output and rotor speed. Controller 26 may also determine and record the deflection values sensed by sensors 22 while arrangement 10 operates in this nearly optimal operating range. The deflection values may change as the condition of the blade changes due to the changing actuator command data. These deflections values from sensors 22 may be used to calculate or otherwise define the initial tolerance band for the output of sensors 22. Thus, as arrangement 10 initially operates in a closed loop mode during the first few revolutions of rotor 16, controller 26 may determine the sequence of command data for controlling actuator 28. Further, controller 26 may determine the tolerance bands for the sensor data during the first few revolutions. Controller 26 may then wirelessly transmit the determined tolerance bands to sensors 22, and sensors 22 may locally store the received tolerance bands. Thus, sensors 22 can ascertain when their measurements are out of tolerance, and thus when sensors 22 should transmit their sensor measurements to controller 26 during closed loop operation.

After the above-described startup or initialization process, controller 26 may switch back into open loop operation, which is also described above. More particularly, controller 26 may transmit a wireless command to sensors 22 instructing sensors 22 to stop sending their measurements on a continual basis and begin to send their measurements only when they are out of the tolerance band that controller 26 previously wirelessly transmitted to sensors 22. Parameter measurements may be repeatedly taken by sensors 22 but not reported to controller 26 until and unless the measurements are out of the tolerance band.

The system could be dynamically switched into the closed loop mode whenever required by using a wireless command from controller 26 to sensors 22. For example, controller 26 may instruct sensors 22 to go into a closed loop mode and restart the initialization procedure on a routine, periodic basis, such as once per day. Alternatively, or in addition, controller 26 may direct sensors 22 to go into a closed loop mode and restart the initialization procedure whenever sensors 22 are operating in open loop mode, but some other parameter of wind turbine arrangement 10 is out of bounds, such as the speed of rotor 16 or the level of electrical power output by arrangement 10, for example.

Figure 3:
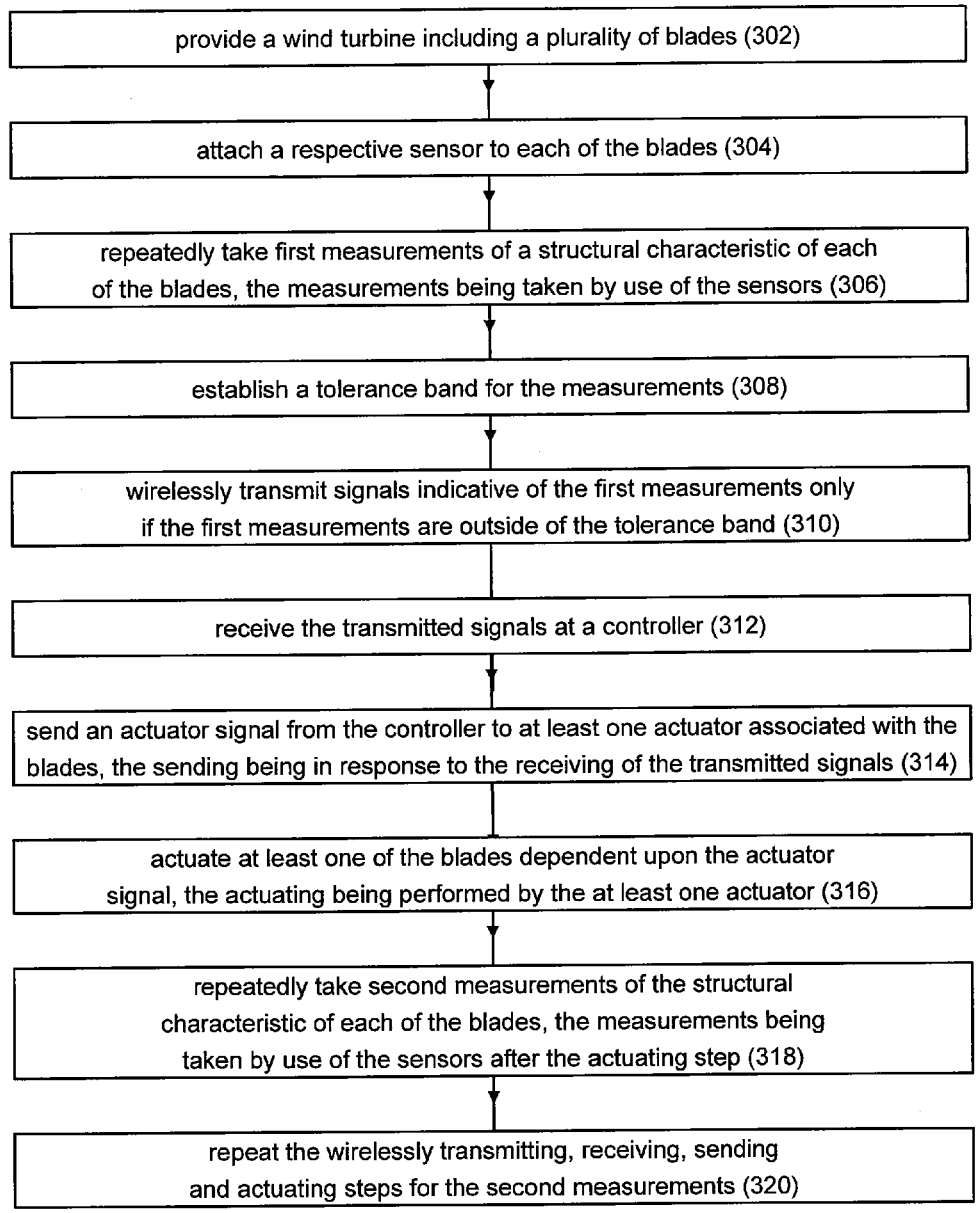
FIG. 3 is a flow chart of an embodiment of a method of the present invention for operating a wind turbine.

In FIG. 3 there is shown one embodiment of a method 300 of the present invention for operating a wind turbine. In a first step 302, a wind turbine including a plurality of blades is provided. For example, a wind turbine such as that depicted in FIG. 1 may be provided.

In a second step 304, a respective sensor is attached to each of the blades. In the embodiment of FIGS. 1-2, sensors 22a-c may be attached to each of blades 20a-c, respectively.

Next, in step 306, first measurements are repeatedly taken of a structural characteristic of each of the blades. The measurements are taken by use of the sensors. For example, the instantaneous deflection of each of blades 20a-c from their respective longitudinal axes 24a-c may be measured by sensors 22a-c, respectively. The measurements may be repeated periodically time-wise, or may be repeated whenever the blade reaches certain location(s) in its rotation about hub 18.

In step 308, a tolerance band is established for the measurements. A tolerance band, which may be a range of acceptable deflection measurements, may be established in a variety of ways. For example, a tolerance band may be programmed or loaded into memory of sensors 22a-c before sensors 22a-c are installed or attached to blades 10a-c. As another possibility, during an initial start-up operation, sensors 22a-c may transmit all of their measurements in a closed loop fashion. Controller 26 may adjust the actuator signals to actuator 28 until one or more other operating characteristics of the turbine are in steady-state and are themselves within an acceptable range. For example, controller 26 may monitor the rotational speed of blades 20a-c and/or the electrical output of the turbine. When these parameters are within an acceptable steady-state range, controller 26 may record the corresponding measurements from sensors 22a-c, and statistical analysis may be used on the sensor measurements to establish the tolerance band. In one embodiment, controller 26 may determine by interpolation and/or extrapolation what sensor measurements correspond to the upper and lower limits of the other monitored operating parameters (e.g., rotor speed and power output). In another embodiment, controller 26 may collect the sensor measurements corresponding to the acceptable operating parameters and calculate a tolerance band ranging from an average of the sensor measurements minus a standard deviation to an average of the sensor measurements plus a standard deviation. Once the tolerance band is determined, the band may be communicated and stored within sensors 22a-c for use during their open loop operation.

In a next step 310, signals indicative of the first measurements are wirelessly transmitted only if the first measurements are outside of the tolerance band. For example, in the open loop operation, sensors 22a-c may refrain from sending any signals at all until their measurements are outside of the tolerance band. Thus, sensors 22a-c will not waste battery power by sending unnecessary signals. However, measurements that are outside of the tolerance band may be wirelessly transmitted from sensors 22a-c to controller 26. The signals may be transmitted by radio frequency or infra-red technology, for example.

Next, the transmitted signals may be received at a controller (step 312). More specifically, controller 26 may receive the measurement signals that are wirelessly transmitted by one or more of sensors 22a-c.

In step 314, an actuator signal is sent from the controller to at least one actuator associated with the blades. The sending is in response to the receiving of the transmitted signals. That is, controller 26 may transmit an actuator signal to actuator 28 in response to receiving the signal indicating that the deflection of at least one blade is out of tolerance. Because excessive blade deflection may result from the blade catching too much wind on its face, controller 26 may command actuator 28 to rotate the excessively deflected blade so that the blade's face no longer faces the wind so squarely. The actuator signal may be dependent upon wind direction data from wind direction sensor 34. That is, controller 26 may receive the wind direction data from wind direction sensor 34 and may factor in that wind direction data when calculating the actuator signal.

In a next step 316, at least one of the blades is actuated dependent upon the actuator signal. The actuating is performed by the at least one actuator. For example, upon, and in response to, receiving the actuator signal from controller 26, actuator 28 may obey the command and rotate the blade about its axis 24 so that the narrow edge of the blade is directed more in the direction of the wind, and the wider face of the blade is oriented more away from the wind. This blade adjustment may be in response to excessive blade deflection.

Next, in step 318, second measurements are repeatedly taken of the structural characteristic of each of the blades. The measurements are taken by use of the sensors after the actuating step 316. For example, the instantaneous deflection of each of blades 20a-c from their respective longitudinal axes 24a-c may again be measured by sensors 22a-c, respectively, after one or more of blades 20a-c have been rotated by actuator. Again, the measurements may be repeated periodically time-wise, or may be repeated whenever the blade reaches certain location(s) in its rotation about hub 18.

In a final step 320, the wirelessly transmitting, receiving, sending and actuating steps are repeated for the second measurements. That is, the above-described steps of wirelessly transmitting sensor signals from sensors 22a-c, receiving the sensor signals at controller 26, sending actuator signals from controller 26 to actuator 28, and actuating one or more of blades 10a-c by use of actuator 28 are repeated in response to the second measurements made by sensors 22a-c. The cycle may continue indefinitely with third, fourth, etc., sensor measurements, thereby maintaining the deflection of blades 10a-c within the tolerance band.

The invention may be useful as applied to wireless sensor networks that are part of a system which monitors the condition and/or an environment of a machine or an appliance, e.g., a wind turbine. The invention may be especially useful if the system has the following three components with the corresponding functions:

a) sensors for monitoring parameters;
b) a controller for comparing the sensor outputs with the target values and deriving signals to control actuators; and
c) actuators to close the loop and adjust certain parameters so that the sensor outputs get very close to the target values.

Figure 4:
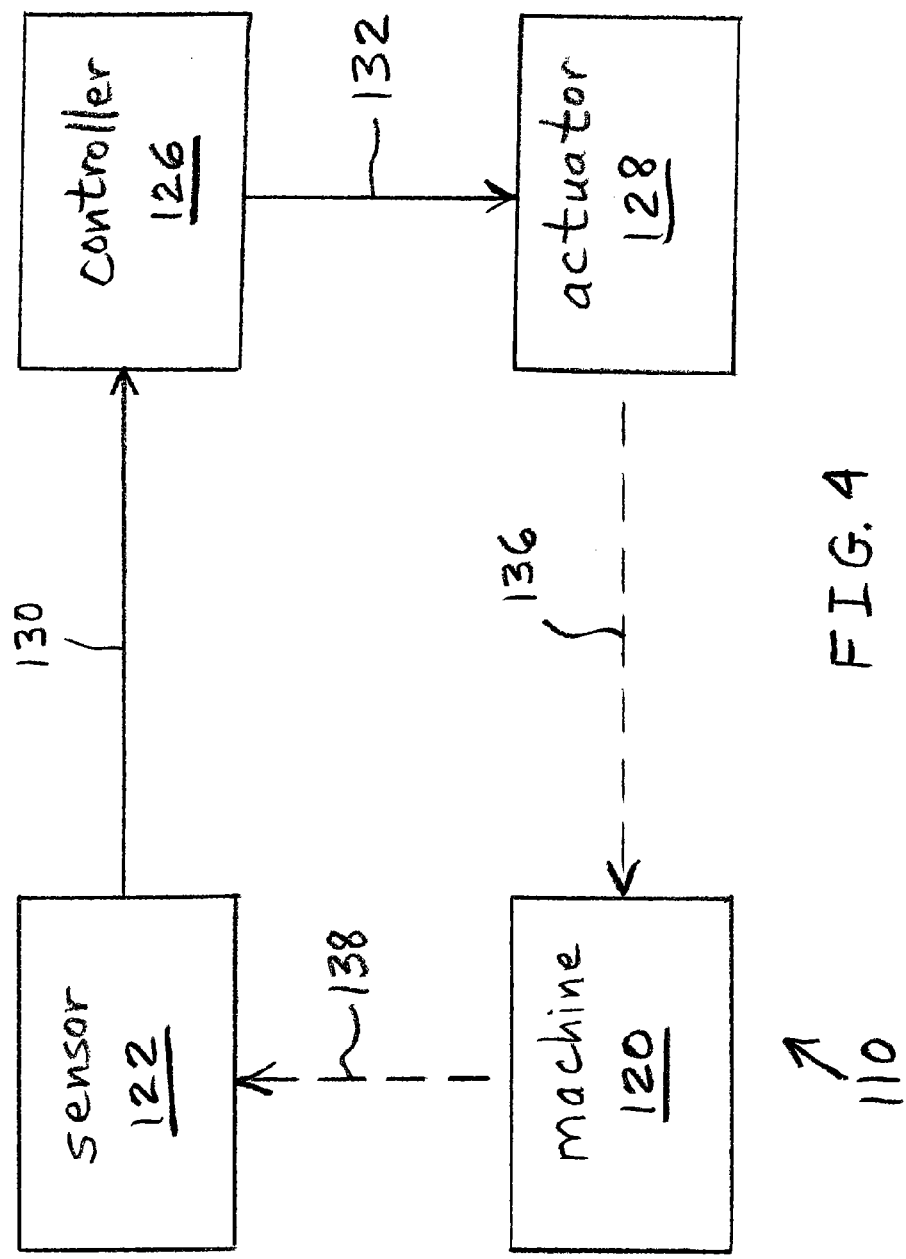
FIG. 4 is a block diagram of a more generalized embodiment of an energy-efficient wireless communication arrangement of the present invention.

In one particular embodiment described with reference to FIGS. 1-3, the invention is applied to a wind turbine. However, it is to be understood that the invention may also apply to many different kinds of machines or appliances. A more generalized embodiment of an arrangement 110 of the invention is illustrated in FIG. 4, including a machine 120, a sensor 122, a controller 126, and an actuator 128.

Arrangement 110 may operate a feedback loop for machine 120. More particularly, sensor 122 may transmit radio frequency wireless signals 130 to controller 126. Signals 130 may indicate a measured value of some parameter of machine 120 or of its environment. The parameter may be a parameter that may be affected and changed by the operation of machine 120. When the measured parameter is beyond a safe or desirable value, sensor 122 transmits a wireless signal 130 to controller 126 indicative of the parameter being out of bounds. However, in order to conserve battery power, so long as the measured parameter remains within the tolerance band, sensor 122 may refrain from sending signals 130.

Controller 126 may respond to the signal 130 indicating the measured parameter being out of bounds by transmitting a command actuator signal 132 to actuator 128. Actuator signal 132 may instruct actuator 128 to actuate machine 120 in an attempt to cause the measured parameter to go back within the acceptable range.

Actuator signal 132 may be dependent upon other measured parameters associated with machine 120 or its environment. Other sensors (not shown) in and around machine 120 may sense such parameters and may be in wired or wireless communication with machine 120. Controller 126 may use the sensor readings from these other sensors in producing actuator signal 132.

As indicated at 136, actuator 128 may respond to signal 132 by exerting some physical force on machine 120 or by applying some electrical signal to machine 120, for example. Sensor 122 may then sense, as indicated at 138, the same parameter on which the earlier signal 130 was based. This second sensing of the parameter, however, may be after the effect of action 136 by actuator 128 has been realized. Sensor 122 then may re-transmit a signal 130 that is indicative of the new parameter measurement, thereby completing the feedback loop.

According to one embodiment of the invention, instead of there being a permanently closed loop between machine 120, sensor 122, controller 126 and actuator 128, the system operates in an open loop configuration for as long as possible by applying a sequence of input values to actuator 128. This sequence may cover the time period for one complete cycle of the operation of machine 120 and may be repeated with each new such cycle. Sensor 122 may continue to measure data at the same rate as in a closed loop system. However, sensor 122 does not transmit any data to the base station (e.g., controller 126) so long as the sensor data is within a predefined tolerance band. Sensor 122 compares the collected data measurements with the tolerance band. This comparison may be performed locally within the sensor node. Thus, sensor 122 may have some processing capability in order to ascertain whether the collected data is within limits.

As soon as the sensor data goes beyond the limits of the predefined tolerance band, sensor 122 may initiate a communication between the sensor node and the base station (e.g., controller 126) in order to supply the recent sensor data to the controller. Controller 126 may then calculate a new sequence of control data for actuator 128. For example, if the sensor data indicates that the measured parameter is outside of the allowed limits, then controller 126 may send a sequence of control data (e.g., commands) to actuator 128 to cause actuator 128 to exert a force on machine 120 or apply a voltage to machine 120 to change the operation of machine 120 and thereby possibly bring the measured parameter back into the tolerance band. The control data sent by controller 126 may possibly be based on other sensed parameters other than the parameter sensed by sensor 122. The control data, which is used to control actuator 128 throughout a complete cycle of the operation of machine 120, may also take into account the changing states of various parts of machine 120 throughout the operating cycle of machine 120, which may call for the control data to be different during different parts of the machine operating cycle.

The new or "revised" sequence of control data may then be repeated for each subsequent operating cycle of machine 120 until the sensor data again includes values that are out of the tolerance band. In that case, the above-described process is repeated with a new actuator control data signal being produced and applied to actuator 128, and the resulting sensor data again being collected.

The tolerance band for the sensor data may be stored in memory within the sensor. However, the desired tolerance band may change with time due to deterioration of the machine or changes in the desired machine output, for example. Thus, in one embodiment, the controller may wirelessly transmit revised tolerance bands as needed to the sensor, and the sensor may store the newly received tolerance bands in local memory.

Because the sensor transmits sensor data only when needed, e.g., only when controller 126 needs to take some action by changing the control sequence data, battery power usage is reduced and sensor battery life is extended. For example, if the scheme of the present invention leads to the sensor communicating a sequence of data for only two seconds per minute instead of continuously, then the demands for sensor battery power needed for communication may be reduced by a factor of thirty.

In one embodiment, immediately after installation, arrangement 110 may operate in a closed-loop mode for a couple of initial operating cycles of machine 120. Thus, sensor 122 may initially wireless transmit all of its readings to controller 126. Likewise, controller 126 may respond to each set of readings from sensor 122 by sending a new set of command data to actuator 128. In addition to the machine operating parameter measured by sensor 122, the command data from controller 126 may depend upon other parameters affecting machine 120 as measured by other sensors (not shown). In response to the command data from controller 126, actuator 128 may then continuously tweak the physical state of machine 120 or the electrical signals applied to machine 120.

As machine 120 begins to operate, controller 126 may adjust its command data to actuator 128 in order to reach optimal, or at least acceptable, values for the output parameters of machine 120. Controller 126 may also determine and record the measured sensor values sensed by sensor 122 while arrangement 110 operates in this nearly optimal operating range. These measured values from sensor 122 may be used to define the initial tolerance band for the output of sensor 122. Thus, as arrangement 110 initially operates in a closed loop mode during the first few operating cycles of machine 120, controller 126 may determine the sequence of command data for controlling actuator 128. Further, controller 126 may determine the tolerance band for the sensor data during the first operating cycles. Controller 126 may then wirelessly transmit the determined tolerance band to sensor 122, and sensor 122 may locally store the received tolerance band. Thus, sensor 122 can ascertain when its measurements are out of tolerance, and thus when sensor 122 should transmit its sensor measurements to controller 126 during closed loop operation.

After the above-described initialization process, controller 126 may switch back into open loop operation, which is also described above. More particularly, controller 126 may transmit a wireless command to sensor 122 instructing sensor 122 to stop sending its measurements on a continual basis and begin to send its measurements only when they are out of the tolerance band that controller 126 previously wirelessly transmitted to sensor 122.

The system could be dynamically switched into the closed loop mode whenever required by using a wireless command from controller 126 to sensor 122. For example, controller 126 may instruct sensor 122 to go into a closed loop mode and restart the initialization procedure on a routine, periodic basis, such as once per day. Alternatively, or in addition, controller 126 may direct sensor 122 to go into a closed loop mode and restart the initialization procedure whenever sensor 122 is operating in open loop mode, but some other parameter of machine 120 is out of bounds, such as the operating speed of machine 120 or the level of output of machine 120, for example.

The present invention may be particularly applicable to situations in which a sensor cannot be easily hard-wired to either a source of AC power or to a controller to which the sensor reports its readings. Such applications may include automotive tire pressure sensors, helicopter mast torque meters, rotating elements such as the shaft of a limited stroke motor, and gas turbine engine temperature sensors, for example.

The present invention may also have medical applications in situations in which a device inserted into the human body runs on battery power and includes a sensor. For example, a device inserted into the bloodstream may clear plaque from arteries. Such a device may be a plaque-scraping catheter or grinder. The sensor on such a device may be a plaque detector that locates plaque within the artery. In one embodiment, the plaque sensor is a camera that captures video images of the inside of the artery, including the plaque deposits therein. The camera sensor output may be in the form of image data. If the device ascertains that the images are within the tolerance band (e.g., do not show excessive plaque), then the images may not be transmitted. However, if the device ascertains that the images are outside of the tolerance band (e.g., show excessive plaque), then the images may be wirelessly transmitted. A controller outside the human body may receive the images and display the images on a video screen so that the images may be interpreted and responded to by a human viewing the video screen. Alternatively, the image data may be automatically electronically analyzed by the controller outside of the human body. The analysis may determine whether the image data is indeed outside a tolerance band, which indicates the presence of plaque. If the image data does indicate the presence of plaque, then the controller may send an actuator signal to an actuator that grinds, scrapes, or otherwise removes the plaque. The actuator signal may control the speed, location and/or operation of the actuator. In another embodiment, the plaque sensor may be pressure sensor that determines locations along the length of the artery at which there are significant plaque deposits.

In another medical application of the present invention may be in gastrointestinal devices that perform therapeutic drug delivery while in the gastrointestinal tract. Such a device may include a sensor that detects the presence of a certain compound, or a predetermined level of acidity, within the gastrointestinal tract. When sensor readings are within the tolerance band, then the sensor readings are not transmitted. However, when sensor readings are outside the tolerance band, which indicates the presence of the certain compound, or the predetermined level of acidity, the sensor transmits wireless signals to a controller outside the human body. Medical personnel and/or a controller may analyze the received sensor signal and determine based thereon whether the drug carried by the device should be delivered within the gastrointestinal tract. If so, a wireless signal may be transmitted from the controller to an actuator within the device instructing the actuator to release at least a portion of the drug into the gastrointestinal tract. The device may thereafter remain in the tract, possibly moving to another location therein, and may make further measurements. If the presence of the certain compound or the predetermined level of acidity is again sensed, then the cycle may be repeated with wireless signals being transmitted from the sensor to the controller, and wireless actuator signals being sent from the controller to the actuator to thereby release another portion of the drug into the gastrointestinal tract.

The present invention has been described herein as using open loop operation in order to conserve a transmitting sensor's battery power. However, it is to be understood that the invention may also be useful in other scenarios. For example, open loop operation may be desirable or advantageous in situations in which excessive wireless sensor transmission would cause unwanted interference with other electronics. Another scenario in which open loop operation may be desirable is when interception of sensor measurements by an eavesdropper is to be avoided.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating a wind turbine, said method comprising the steps of:
   providing a wind turbine including a plurality of blades;
   attaching a respective sensor to each of the blades;
   repeatedly taking first measurements of a structural characteristic of each of the blades, the measurements being taken by use of the sensors;
   establishing a tolerance band for the measurements;
   wirelessly transmitting signals indicative of the first measurements only if the first measurements are outside of the tolerance band;
   receiving the transmitted signals at a controller;
   sending an actuator signal from the controller to at least one actuator associated with the turbine, the sending being in response to the receiving of the transmitted signals;
   performing an action associated with the turbine dependent upon the actuator signal, the action being performed by the at least one actuator;
   repeatedly taking second measurements of the structural characteristic of each of the blades, the measurements being taken by use of the sensors after the actuating step; and
   repeating the wirelessly transmitting, receiving, sending and performing steps for the second measurements.

2. The method of claim 1 wherein the structural characteristic comprises a deflection of each of the blades or a level of vibration.

3. The method of claim 1 wherein the controller establishes the tolerance band based on initial said first measurements of the structural characteristic or preconfigures the tolerance band in the system.

4. The method of claim 1 wherein the sensors are battery powered or run autonomously using energy harvesting.

5. The method of claim 1 wherein the performing an action includes rotating at least a portion of at least one of the blades about a longitudinal axis of the blade.

6. The method of claim 1 wherein the tolerance band is established based upon values of the first measurements that correspond to at least one parameter of the wind turbine being within an acceptable range.

7. The method of claim 1 wherein the actuating signal is dependent upon at least one measured parameter of the wind turbine other than the structural characteristic of the blades.

8. A method of controlling a machine, said method comprising the steps of:
providing a sensor associated with the machine;
repeatedly taking first measurements of a parameter associated with the machine, the measurements being taken by use of the sensor;
establishing a tolerance band for the measurements;
wirelessly transmitting signals indicative of the first measurements only if the first measurements are outside of the tolerance band;
receiving the transmitted signals at a controller;
sending an actuator signal from the controller to at least one actuator associated with the machine, the sending being in response to the receiving of the transmitted signals;
actuating at least one part of the machine dependent upon the actuator signal, the actuating being performed by the at least one actuator;
repeatedly taking second measurements of the parameter of the machine, the measurements being taken by use of the sensor after the actuating step; and
repeating the wirelessly transmitting, receiving, sending and actuating steps for the second measurements.

9. The method of claim 8 wherein the parameter is a parameter of an environment surrounding the machine.

10. The method of claim 8 wherein the parameter is a structural characteristic of the machine.

11. The method of claim 8 wherein the controller establishes the tolerance band based on initial said first measurements of the parameter or preconfigures the tolerance band in the system.

12. The method of claim 8 wherein the sensor is battery powered or runs using energy harvesting.

13. The method of claim 8 wherein the parameter comprises a first parameter, the tolerance band being established based upon values of the first measurements that correspond to at least one second parameter of the machine being within an acceptable range.

14. The method of claim 8 wherein the parameter comprises a first parameter, the actuating signal being dependent upon at least one measured second parameter of the machine, the second parameter being different from the first parameter.

15. A method of controlling a machine, said method comprising the steps of:
installing a sensor, a controller and an actuator associated with the machine;
upon startup of the machine, operating the sensor, controller and actuator in a closed loop fashion, including:
taking a first startup measurement of a parameter associated with the machine, the measurement being taken by use of the sensor;
wirelessly transmitting a startup measurement signal indicative of the startup measurement;
receiving the transmitted startup measurement signal at a controller;
sending a startup actuator signal from the controller to the actuator, the sending being in response to the receiving of the transmitted startup signal;
actuating at least one part of the machine dependent upon the startup actuator signal, the actuating being performed by the actuator;
taking a second startup measurement of the parameter of the machine, the second startup measurement being taken by use of the sensor after the actuating step;
repeating the wirelessly transmitting, receiving, sending and actuating steps for the second startup measurements;
calculating a tolerance band for steady state measurements of the parameter, the calculating being dependent upon the received startup measurement signals; and
wirelessly transmitting the calculated tolerance band from the controller to the sensor; and
operating the machine in steady state in an open loop fashion, including:
repeatedly taking first steady state measurements of the parameter associated with the machine, the first steady state measurements being taken by use of the sensor;
wirelessly transmitting steady state measurement signals indicative of the first steady state measurements only if the first steady state measurements are outside of the tolerance band;
receiving the transmitted first steady state measurement signals at a controller;
sending a steady state actuator signal from the controller to the actuator, the sending being in response to the receiving of the transmitted first steady state measurement signals;
actuating at least one part of the machine dependent upon the steady state actuator signal, the actuating being performed by the actuator;
repeatedly taking second steady state measurements of the parameter of the machine, the measurements being taken by use of the sensor after the actuating that is based on the steady state actuator signal; and
repeating the wirelessly transmitting, receiving, sending and actuating steps for the second steady state measurements.

16. The method of claim 15 comprising the further step of transmitting an open loop command signal from the controller to the sensor, the open loop command signal instructing the sensor to transmit the sensor measurement signals only when the sensor measurement signals are outside of the tolerance band.

17. The method of claim 15 comprising the further step of periodically transmitting a closed loop command signal from the controller to the sensor, the closed loop command signal instructing the sensor to transmit the sensor measurement signals for all measurements by the sensor.

18. The method of claim 15 comprising the further step of transmitting a closed loop command signal from the controller to the sensor in response to an other parameter associated with the machine having an undesirable value, the closed loop command signal instructing the sensor to transmit the sensor measurement signals for all measurements by the sensor.

19. The method of claim 15 wherein the parameter comprises a first parameter, the tolerance band being established based upon values of the first measurements that correspond to at least one second parameter of the machine being within an acceptable range.

20. The method of claim 15 wherein the parameter comprises a first parameter, the actuating signal being dependent upon at least one measured second parameter of the machine, the second parameter being different from the first parameter.

* * * * *